April 21, 1953  R. L. BROWNLEE  2,635,649
TIMBER SAW
Filed July 12, 1949
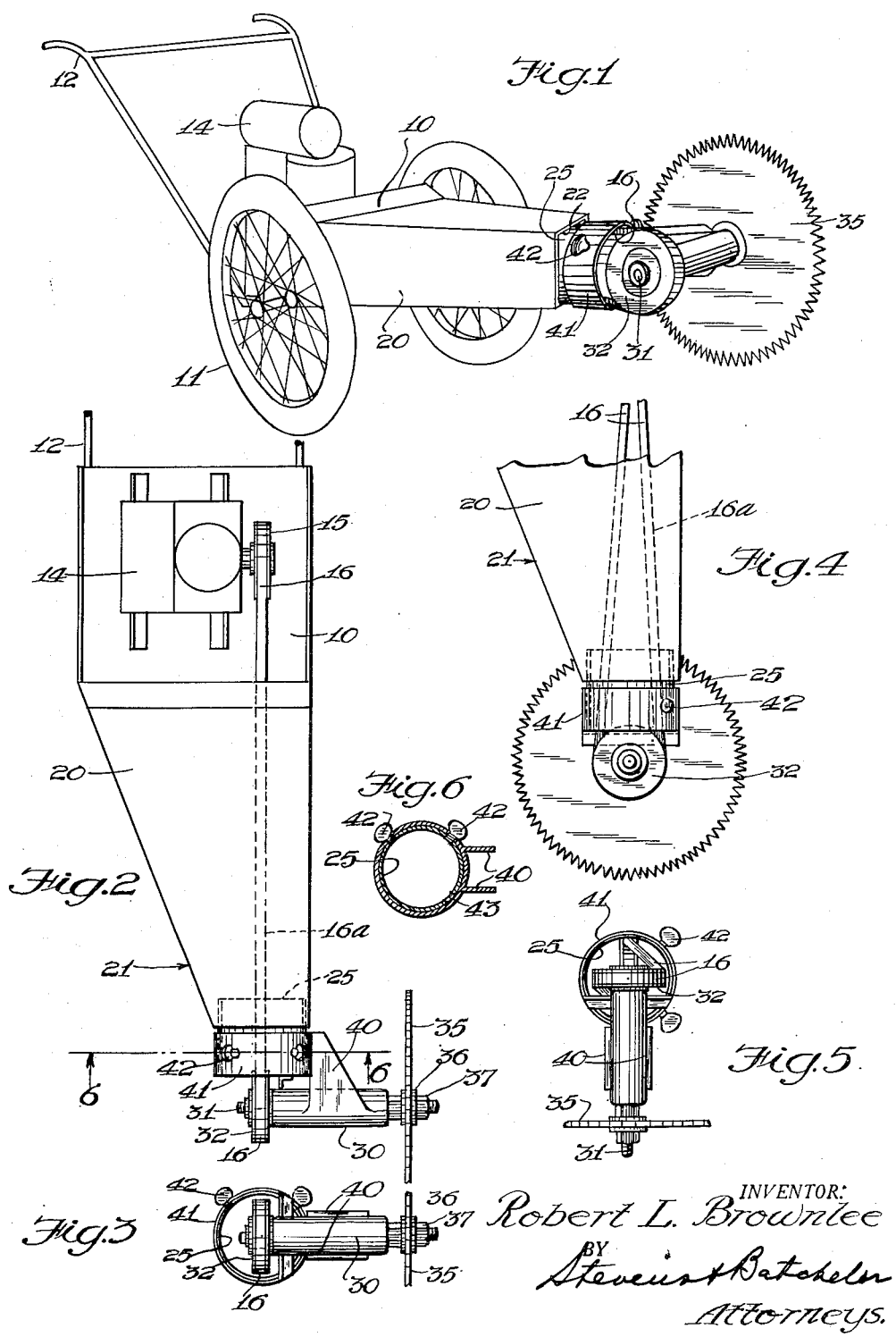
INVENTOR:
Robert L. Brownlee
BY Stevens & Batchelor
Attorneys.

Patented Apr. 21, 1953

2,635,649

UNITED STATES PATENT OFFICE 2,635,649

TIMBER SAW

Robert L. Brownlee, Mokena, Ill.

Application July 12, 1949, Serial No. 104,185

3 Claims. (Cl. 143—43)

My invention relates to timber saws of the type carried by a hand cart and applicable to standing and fallen trees. Thus, where the tree is standing, the saw blade—which is a circular one—is positioned horizontally and the cart advanced to cause the tree to be severed at a point near its base. On the other hand, where trees are in a fallen position or in the form of logs, the saw blade is adjusted to a vertical position and the cart operated in the same manner as before.

Certain saws of the above type carry an engine from which a belt runs to a pulley on a crossshaft, the latter also carrying the saw blade. Various mechanisms have been devised for the adjustment of the saw blade to the positions mentioned above without prejudice to the driving belt as it twists or untwists during the corresponding adjustment. Some mechanisms for the purpose recited have been quite involved, while others caused the apparatus to become unduly wide, awkward or clumsy. It is therefore one object of the present invention to devise a holder for the saw mechanism which is quite compact and insures the uniform action of the belt in case of saw blade adjustment.

Another object is to design the novel holder along lines of simplicity and compactness.

An important object is to construct the novel holder largely of sheet metal, whereby to reduce the cost of the saw to a large extent.

With the above objects in view, and any others which may suggest themselves from the description to follow, a better understanding of the invention may be had by reference to the accompanying drawing, in which—

Fig. 1 is a perspective view of the saw as positioned for cutting fallen trees or logs;

Fig. 2 is a top plan view of the saw, with the cart handles broken away;

Fig. 3 is a front end view of the showing in Fig. 2;

Fig. 4 is a view similar to Fig. 2, showing the saw blade positioned horizontally for application to standing trees;

Fig. 5 is a front end view of the showing in Fig. 4; and

Fig. 6 is a section on the line 6—6 of Fig. 2.

Referring specifically to the drawing, 10 denotes the frame, 11 the wheels and 12 the handles of a typical hand cart employed as a rolling support for the timber saw. The frame carries a power plant 14 equipped with a pulley 15 from which a V-belt 16 extends in forward direction.

For the purpose of the present invention, the frame 10 is fitted with a tubular housing 20 which is made of heavy gauge sheet metal and has a rectangular cross-section. The housing tapers in forward direction from one side, as indicated at 21, so that its front end appears square, as indicated at 22; and the belt 16 extends through the housing as indicated by dotted lines at 16a.

The frontal portion of the housing 20 receives a cylindrical tube 25 to a partial extent, as indicated in Fig. 2, the longer portion of the tube 25 projecting forwardly from the housing. The tube 25 makes a snug fit with the housing in the regions of contact therewith; and it is welded to the housing in such regions to form a rigid extension thereof.

The saw blade unit involves a bearing 30 which journals a shaft 31. The shaft receives a pulley 32 at one end and in a position to receive the front end of the belt 16; and the other end of the shaft has the saw blade 35 mounted by conventional means, such as washer 36 and nut 37.

The bearing 30 has rearward parallel webs 40 which are formed at one side with a band 41, the latter being of a diameter to slidingly fit the tube 25 in front of the housing 20. Initially, the position of this tube is with its axis coinciding with the axis of the belt drive; and it follows, therefore, that the band 41 may be employed to rotate the pulley 32 between vertical and horizontal positions without prejudice to the uniform position of the belt drive. Thus, when the pulley 32 is in the vertical position, the runs of the belt will be regular; and when the pulley 32 is turned to the horizontal position—in one or the other direction—the runs of the belt will become twisted uniformly and without prejudice to the operation of the belt.

It follows now that the saw blade shaft 31 may be adjusted by turning the band 41 on the tube 25 in a manner to position the saw blade 35 either vertically, as shown in Figs. 1, 2 and 3, or horizontally, as shown in Figs. 4 and 5.

Means are provided for fixing the adjustments just referred to. Thus, Fig. 6 shows that the tube 25 is tapped in two circularly spaced places to receive thumbscrews 42 directed from the band 41. The ring has a third tapped perforation at 43 which enables the adjustment of the thumbscrews to be made at one side, per Fig. 5, when the band is turned ninety degrees in a clockwise direction according to Fig. 6 to position the saw blade 35 horizontally. This adjusting means is quite simple and rigid, but other means may be devised, if it is considered desirable or expedient, to adjust the band to the two positions mentioned or to any other desired position around the tube 25.

It will now be apparent that the novel holder is an apparatus which simplifies the adjustable support of the saw blade in relation to the belt 16. Thus, the simple housing 20 suffices to project the tube 25 to a position which is both in line with the belt drive and favorable to the rotary mounting of the saw blade bearing 30. With the band 41 centered on the belt drive, the relation between the pulleys 15 and 32 is always uniform, irrespective of the position to which the saw blade may be adjusted. Further, the housing 20 encases the greater portion of the belt, protecting the same from interference by external objects, such as tree branches, brush, etc. Further, the construction of the bearing 30 is compact and sufficiently rigid to provide a good support for the saw blade and maintain the proper relation of the drive to the same. Finally, it is apparent that the novel holder employs a minimum number of parts consistent with requirements for structural and operative efficiency.

While I have described the invention along specific lines, various minor changes or refinements may be made therein without departing from its principle, and I reserve the right to employ all such changes and refinements as may come within the scope and spirit of the appended claims.

I claim:

1. A timber saw comprising a wheeled push cart including a support, a power plant carried by the latter and presenting a drive pulley at one side, a belt projected forwardly from the drive pulley, a driven pulley receiving the forward end of the belt, a tube behind the driven pulley and centered on an axis connecting the centers of the pulleys, a housing for the belt extended forwardly from the support and carrying the rear end portion of said tube, a journal for the driven pulley rotatably adjustable around the forward portion of the tube to facilitate the turning of the driven pulley in a plane transverse of said axis, and a saw blade operated by the driven pulley by way of said journal, said journal including a bearing, a common shaft for the driven pulley and the saw blade journaled in the bearing, a band encircling the tube, and spaced webs rigidly securing the bearing and band together.

2. A timber saw comprising a wheeled push cart including a support, a power plant carried by the latter and presenting a drive pulley at one side, a belt projected forwardly from the drive pulley, a driven pulley receiving the forward end of the belt, a tube behind the driven pulley and centered on an axis connecting the centers of the pulleys, a housing for the belt extended forwardly from the support and carrying the rear end portion of said tube, a journal for the driven pulley rotatably adjustable around the forward portion of the tube to facilitate the turning of the driven pulley in a plane transverse of said axis, and a saw blade operated by the driven pulley by way of said journal, the support being substantially the width of the cart, said tube being narrow in comparison, and the housing tapering from the width of the support to form a relatively close entrance for said rear end portion.

3. A timber saw comprising a wheeled push cart including a support, a power plant carried by the latter and presenting a drive pulley at one side, a belt projected forwardly from the drive pulley, a driven pulley receiving the forward end of the belt, a tube behind the driven pulley and centered on an axis connecting the centers of the pulleys, a housing for the belt extended forwardly from the support and carrying the rear end portion of said tube, a journal for the driven pulley rotatably adjustable around the forward portion of the tube to facilitate the turning of the driven pulley in a plane transverse of said axis, and a saw blade operated by the driven pulley by way of said journal, the support being substantially the width of the cart, said tube being narrow in comparison, and the housing being of rectangular cross-section and tapering from the width of the support to form a relatively close square entrance in which the walls of said rear end portion are secured to those of the entrance where they contact the same.

ROBERT L. BROWNLEE.

References Cited in the file of this patent

UNITED STATES PATENTS

| Number | Name | Date |
| --- | --- | --- |
| 2,353,873 | Brownlee | July 18, 1944 |
| 2,435,192 | Arsneau | Feb. 3, 1948 |
| 2,455,369 | Kuykendall | Dec. 7, 1948 |

FOREIGN PATENTS

| Number | Country | Date |
| --- | --- | --- |
| 112,225 | Australia | Dec. 30, 1940 |